(12) United States Patent
Trimper et al.

(10) Patent No.: US 9,122,844 B2
(45) Date of Patent: Sep. 1, 2015

(54) PROXY DEVICE FOR MANAGING DIGITAL RIGHTS

(71) Applicant: Verizon Patent and Licensing Inc., Basking Ridge, NJ (US)

(72) Inventors: John K. Trimper, Groton, MA (US); Kiran K. Patel, Wesley Chapel, FL (US); Dheeraj Joshi, Falls Church, VA (US); Christopher Carey, Manhattan Beach, CA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 44 days.

(21) Appl. No.: 14/066,971

(22) Filed: Oct. 30, 2013

(65) Prior Publication Data

US 2015/0121554 A1   Apr. 30, 2015

(51) Int. Cl.
*G06F 15/16* (2006.01)
*G06F 21/10* (2013.01)

(52) U.S. Cl.
CPC .................................. *G06F 21/10* (2013.01)

(58) Field of Classification Search
CPC . G06F 21/10; G06F 21/62; G06F 2221/0753; G06F 17/30905; G06F 21/50; G06F 21/51; G06F 21/606; G06F 21/6218; G06F 21/6236; G06F 21/6281; G06F 21/78; G06F 2211/008; G06F 2221/0711; G06F 17/30289; G06F 2221/0766; G06F 21/105; G06F 2221/008; G06F 2221/0733; G06F 2221/0735; G06F 17/30029; G06F 17/30038; G06F 2221/213; G06F 17/301; G06F 17/30085; H04L 2209/603; H04L 9/0825; H04L 9/083; H04L 2463/101; H04L 63/0428; H04L 9/0822; H04L 2209/60; H04L 2209/606; H04L 2463/062; H04L 63/06; H04L 63/10; H04L 9/3247; H04L 12/587; H04L 12/5895; H04L 2209/56; H04L 9/3236; H04L 9/3249; H04L 63/0227; H04L 29/06027; H04L 63/0435; H04L 63/08; H04L 63/123; H04L 65/4084; H04L 65/80; H04L 9/3213; H04L 9/3271; G06Q 10/107; G06Q 10/06; G06Q 10/10
USPC ............ 726/26, 29, 6, 18; 707/610, 694, 781; 705/14.4, 14.49, 59
See application file for complete search history.

(56) References Cited

U.S. PATENT DOCUMENTS

| | | | | |
|---|---|---|---|---|
| 7,398,557 B2* | 7/2008 | de Jong | | 726/29 |
| 7,958,087 B2* | 6/2011 | Blumenau | | 707/610 |
| 2007/0162400 A1* | 7/2007 | Brew et al. | | 705/59 |
| 2010/0313226 A1* | 12/2010 | Cholas et al. | | 725/92 |
| 2014/0180801 A1* | 6/2014 | Homsany | | 705/14.49 |

* cited by examiner

*Primary Examiner* — Thanhnga B Truong (57) ABSTRACT

A system and method relate to a platform for distributing digital contents (digital content) to various client devices. A digital rights management platform allows a content provider to forward digital contents that is automatically ingested and processed in accordance with various requirements associated with providing the digital contents to the client devices. Information regarding the ingested digital contents may be provided to a coordinator device that uses this information to form a digital rights locker associated with the digital contents. A client device accesses the digital rights locker to obtain a rights token, or a proof of purchase, that is used to obtain rights data for accessing the digital contents.

20 Claims, 7 Drawing Sheets

PROXY DEVICE FOR MANAGING DIGITAL RIGHTS

BACKGROUND

A customer may acquire digital rights to access digital contents available through a service provider. For example, the customer may conduct a transaction to temporarily acquire access to (e.g., rent) the digital contents or acquire permanent access to (e.g., own) the digital contents. The digital rights may include, for example, a storage location and a decryption code associated with the digital contents. The service provider may enable the customer to access the digital contents based on the digital rights while preventing access by the user to other digital contents.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and methods described herein may relate to a platform for distributing digital contents to various client devices. In an exemplary implementation, a digital rights management platform may allow a content provider to forward digital contents that may be automatically ingested and processed in accordance with various requirements associated with providing the digital contents to the client devices. For example, the digital contents may be prepared for streaming and/or downloading, may be converted to a format that is compatible with the client devices, etc. Information regarding the ingested digital contents may be provided to a coordinator device that uses this information to form a digital rights locker associated with the digital contents. A client device may access the digital rights locker to obtain a rights token that may be used to access an ingested version of the digital contents.

One exemplary embodiment is a method implemented by operation of a processor, the method comprising the steps of: receiving information associated with digital contents; processing the information associated with the digital contents to obtain processed digital contents data; registering, based on the processed digital contents data, the digital contents with a coordinator device, wherein the coordinator device maintains a digital rights locker; (4) receiving transaction information associated with an order by a client device for the digital contents; providing a rights token to the coordinator device based on receiving the transaction information, wherein the coordinator device stores the rights token in the digital rights locker; and enabling the client device to access the digital contents using the rights token, wherein the client device acquires the rights token from the digital rights locker.

Another exemplary embodiment is a system that comprises a memory; and a processor. The processor may be configured to receive information associated with digital contents; register the digital contents with a coordinator device, wherein the coordinator device maintains a digital rights locker; process the information associated with the digital contents, store the processed digital contents in the memory; provide a rights token to the coordinator device, wherein the coordinator device stores the rights token in the digital rights locker; and enable a client device to access the digital content using the rights token, wherein the client device acquires the rights token from the digital rights locker.

Another exemplary embodiment is a non-transitory computer-readable medium to store instructions. The instructions comprise one or more instructions that, when executed by a processor, cause the processor to be configured to receive digital contents from a content provider; process the digital contents, wherein processing the digital contents includes forming a rights token; forward the rights token to a coordinator device, wherein the coordinator device stores the rights token in a digital rights locker; receive the rights token from a client device, wherein the client device acquires the rights token from the digital rights locker; and enable the client device to access the processed digital contents based on receiving the rights token.

The terms "digital content" and "digital contents," as used herein, are used interchangeably and refer to contents for which distribution is not limited to a particular memory device, such as streaming media and file downloads. In some cases, digital contents may be referred to as "electronically delivered contents." As used herein, the term "rights token" (or, in some cases, simply "token") may refer to information associated with access rights for the digital contents.

Figure 1:
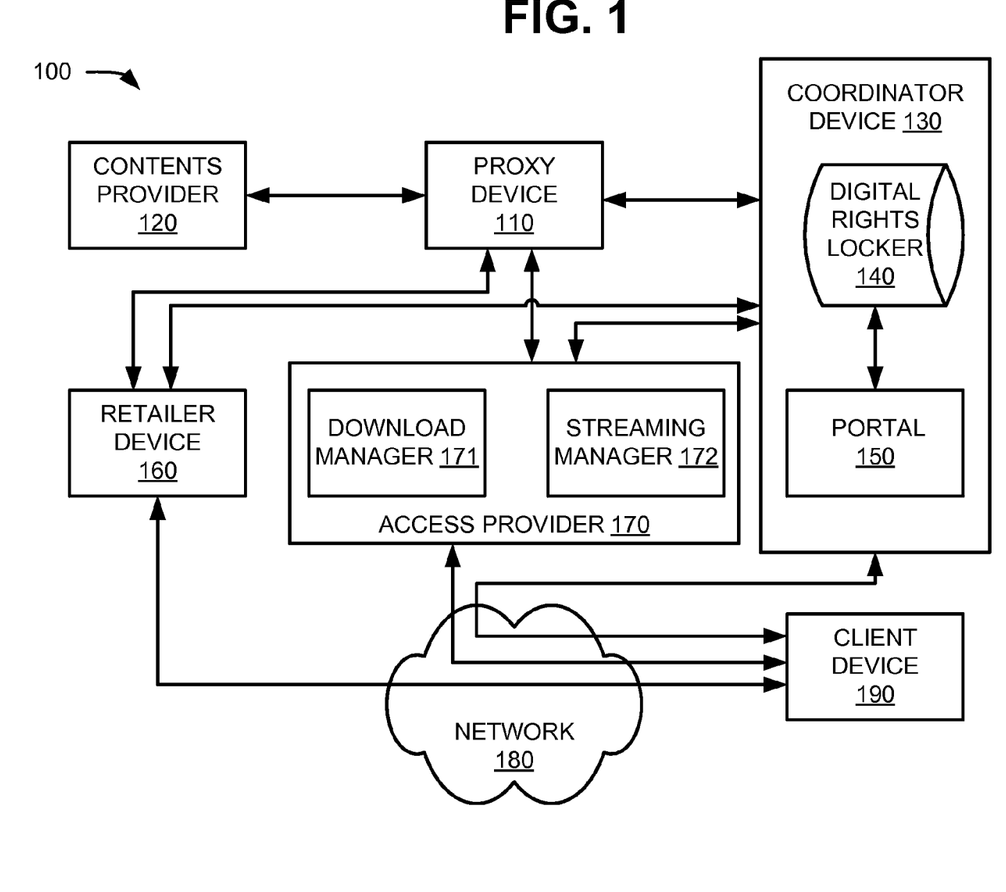
FIG. 1 is an exemplary environment in which systems and/or methods described herein may be implemented.

FIG. 1 is an exemplary environment 100 in which systems and/or methods described herein may be implemented. As illustrated in FIG. 1, environment 100 may include proxy device 110 to receive digital contents and/or metadata related to the digital contents from contents provider 120. Proxy device 110 may provide information related to the digital contents and/or the metadata to coordinator device 130, retailer device 160, and/or access provider 170, such as download manager 171 and/or streaming manager 172. Client device 190 may communicate with retailer device 160 via network 180 to obtain digital rights related to the digital contents (e.g., a right to download and/or stream at least a portion of the digital contents). Data related to the digital rights may be stored in digital rights locker 140, and client device 190 may communicate with portal 150 to obtain the data related to the digital rights. Client device 190 may communicate with access provider 170 to obtain at least a portion of the digital contents using the data related to the digital rights.

Proxy device 110 may obtain digital contents from contents provider 120, and proxy device 110 may process the digital contents for consumption by a customer associated with client device 190. For example, proxy device 110 may provide an appropriately formatted version of the digital contents to access provider 170 for access by client device 190. Proxy device 110 and proxy device 110 may provide information related to the digital contents to coordinator device 130 and/or retailer device 160.

For example, proxy device 110 may identify a contents identifier and may provide a properly formatted version of the contents identifier to the coordinator device 130 and/or another component of environment 100. For example, proxy device 110 may determine an Asset Logical Identifier (ALID) that denotes an abstract representation of a contents item. An ALID may be referenced in a rights token to identify a logical asset, or the digital contents associated with the rights. An ALID may be formatted as a uniform resource name (URN) that may include, for example, an identifier (or name) of the digital contents, a category of the digital contents (e.g., whether the digital rights relate to a movie, television show, or music), and relationship data identifying related digital contents (e.g., other episodes of a television show).

Proxy device 110 may also identify an Asset Physical Identifier (APID), which refers to a physical entity for a media profile that is associated with a logical asset. An ALID explicitly refers to one or more physical assets, such that ALIDs map to one or more APIDs. An ALID may incorporate external registry identifiers, and the syntax rules of that registry allow optional characters that are not considered part of the formal syntax (for example, hyphens in syntax and colons).

Figure 2:
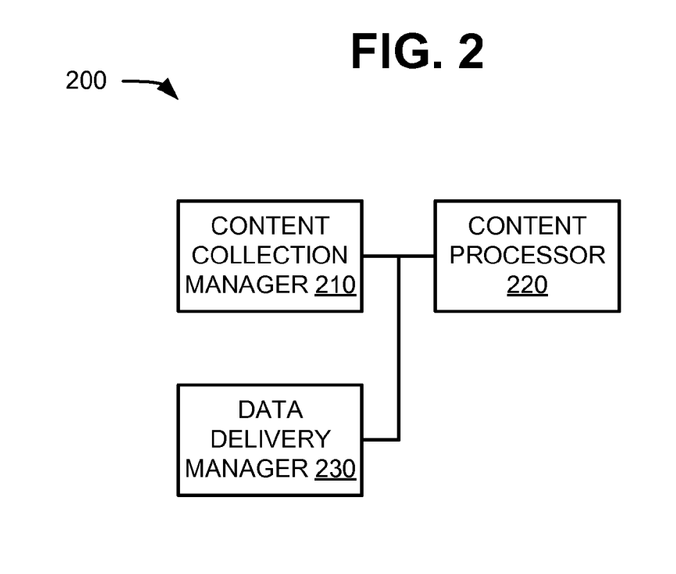
FIG. 2 is a block diagram of exemplary functional components of a proxy device included in the environment of FIG. 1 according to an implementation.

FIG. 2 shows an exemplary system 200 that corresponds to proxy device 110 in one implementation. System 200 may include, for example, contents collection manager 210, contents processor 220, and data delivery manager 230.

Contents collection manager 210 may acquire the digital contents from contents provider 120. For example, collection manager 210 may establish a session or a communication channel with content provider 120 to receive the digital contents. Contents collection manager 210 may include, for example, a processing device that stores digital contents, and which may implement an interface tool for uploading the digital contents and/or the metadata contents to proxy device 110.

Contents collection manager 210 may further obtain metadata related to the digital contents from contents provider 120. The metadata may include, for example, information identifying a title of the digital contents, people associated with the digital contents (e.g., actors, directors, writers, singers, producers, etc.), a rating or other information identifying an intended audience for the digital contents, pricing information for the digital contents, awards given to the digital contents, a genera for the digital contents, a plot summary, etc.

Contents processor 220 may process the digital contents to prepare the digital contents to be accessed by the client device 190 through access provider 170. For example, contents processor 220 may encode the digital contents into different formats that may that may be compatible with different access provider 170 and/or client devices 190. Contents processor 220 may encode the digital contents using different CODECs, encoding, encryption, compression algorithms, etc. For example, contents processor 220 may convert the digital contents into a common file format (CFF) or other formats for download. The CFF is designed to be compatible with multiple types of client devices 190 (e.g., set-top boxes, computing devices, media players, etc.) In one implementation, the CFF may be a fragmented MPEG-4 container format (fMP4, technically known as ISO/IEC 14496-12 and often called an ISO container). In addition or in the alternative, contents processor 220 may format the digital contents for streaming (i.e., such that the digital content can be divided into portions and the portions can be separately transmitted) to client device 190, such as Moving Pictures Expert Group 4 (MP4), Flash® video (FLV), WebM, advanced system format (ASF), Internet Streaming Media Alliance (ISMA), or another streaming standard. Contents processor 220 may further prepare different versions of the digital contents, such as converting the digital contents into standard definition (SD), high definition (HD), or another format. Similarly, contents processor 220 may further prepare different versions of the digital contents that are compatible with different media players, different types of client devices, different networks 180, etc.

In another implementation, contents processor 220 may process the digital contents to identify metadata associated with the digital contents. For example, contents processor 220 may perform image analysis to identify a title of the digital contents and/or perform audio analysis to identify the voices of actors/singers included in the digital contents.

In another implementation, contents processor 220 may obtain additional information associated with the digital asset from a third-party source. In one instance, contents processor 220 may perform a search based on at least some of the metadata received from content provider 120 and/or from processing the digital contents. For example, contents processor 220 may obtain data regarding other digital contents associated with the actors in the digital contents, video data (e.g., a preview, advertisement poster, etc.), and/or audio data (e.g., a song or a portion of a sound track) associated with the digital contents.

Data delivery manager 230 may interact with coordinator device 130, retailer device 160, access provider 170, and/or client device 190 to exchange a processed version of digital contents, encryption key(s), and/or related data. For example, data delivery manager 230 may provide a contents identifier, such as the ALID associated with the digital contents, to retailer device 160 so that retailer device 160 may advertise the digital contents to client device 190 and to coordinator device 130 so that coordinator device 130 can handle digital rights related to the digital contents.

The configuration of components of system 200 shown in FIG. 2 is for illustrative purposes. Other configurations may be implemented. Therefore, system 200 may include additional, fewer and/or different components, that may be configured in a different arrangement, than that depicted in FIG. 2. For example, system 200 may include a component that interfaces with content provider 120 to provide feedback regarding a status of processing and registering the digital contents, transactions related to the digital contents, access of the digital contents by client device 190, etc. Furthermore, tasks described as being performed by a single device may be performed by two or more devices, and a single device may perform tasks described as being performed by two or more devices of system 200.

Returning to environment 100 shown in FIG. 1, coordinator device 130 may manage data to facilitate interactions within environment 100 and to store an account data and digital rights associated client device 190. Coordinator device 130 may be associated with, for a network address and may be accessed via, for example, web service application protocol interfaces (APIs) and/or via a web portal (i.e., portal 150). As shown in FIG. 1, coordinator device 130 may store digital rights locker 140 and many enable client device 190 to access the digital rights locker 140 via portal 150. For example, portal 150 may authenticate client device 190, identify a domain associated with client device 190, and provide client device 190 with access to a portion of the digital rights locker associated with the domain.

Figure 3:
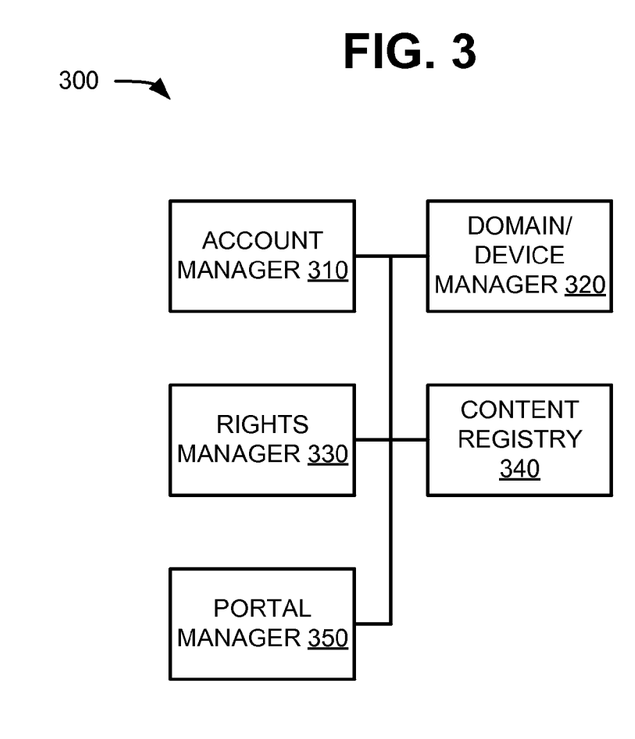
FIG. 3 is a block diagram of exemplary functional components of a coordinator device included in the environment of FIG. 1 according to an implementation.

FIG. 3 depicts components that may be included in an exemplary device 300 that corresponds to coordinator device 130 in one implementation. As shown in FIG. 3, device 300 may include, for example, account manager 310, domain/device manager 320, rights manager 330, contents registry 340, and portal manager 350.

Account manager 310 may manage an account for a customer associated with client device 190. The customer may be associated with identifying data, such as a customer identifier ("ID") and verification data, such as a password. Account manager 310 may store a set of attributes with the customer such as a first name, a last name, an email address, and the like. The customer may be assigned a permission level, which is used to control access to data and services. The customer may also be assigned a parental control setting, which is used to manage access to contents.

Device/domain manager 320 may store data for one or more devices associated with an account. For example, device/domain manager 320 may identify a domain that shares digital rights management (DRM) data to access certain digital contents. Coordinator device 130 may also allow a customer to register one or more client devices 190 to include in the domain. For example, a "home" domain may include one or more personal client devices 190 associated with a customer and an "office" domain may include one or more work-related client devices 190 associated with the customer. Device/domain manager 320 may receive an input from a client device 190 to associate the client device 190 or other client devices 190 with a domain. For example, coordinator device 130 may provide an interface, such as a graphical customer interface ("GUI"), that allows an associated customer (user) to add or remove client device 190 from a domain, to view all client devices 190 associated with the domain, to view and/or modify update metadata associated with client device 190, etc.

Rights manager 330 may store proofs of purchases, such as rights tokens, for digital contents purchased by client device 190 or by another client device 190 associated with a customer that purchased the digital contents. Rights manager 330 may form digital rights locker 140 to store license data associated with the purchase of digital contents. A rights token stored by rights manager 330 may be a representation of the rights associated with an instance of purchased digital contents.

The rights token may enable a client device 190 associated with an account to access the license data from a purchase associated with the account. For example, digital rights from purchases by multiple client devices 190 associated with customers in a family or organization may be organized into an account so that any of the client devices 190 in the account may access the purchased digital contents. Rights manager 330 may further store additional information associated with the rights tokens. For example, rights manager 330 may store other information about rights to the contents associated with the rights token, such as a profile level of the contents and an indication of whether the rights token have been previously used to access the digital contents.

Rights manager 330 may receive the information regarding the purchases from retailer device 160 and generate the rights tokens based on the received information. In one implementation rights manager 330 may further provide an interface, such as via portal 350, that enables, for example, retailer device 160 and/or access provider 170 to access, manage, and/or manipulate the rights tokens. For example, retailer device 160 may modify a rights token during a promotion to enable a free and/or a trial access by client device 190 to digital contents, or access provider 170 may deactivate or otherwise limit a rights token if client device 190 attempts to inappropriately use or access the digital contents using the rights token.

Rights manager 330 may further perform digital rights management (DRM) with respect to rights token. For example, rights manager may label, encode, and/or encrypt a copy of rights token such that use of that copy of the rights token by a client device 190 may be differentiated from use of another copy of the rights token by a different client device 190. In one situation, a copy of the rights token may be used by a particular client device 190, but if that particular client device 190 shares the rights token with another client device 190, the other client device 190 may not use the rights token to access the digital contents.

Contents registry 340 may store information identifying the digital contents associated with the rights tokens managed by rights manager 330. For instance, contents registry 340 may store a unique identifier associated with the digital contents and descriptive and/or technical metadata associated with the digital contents, such as an associated title and/or rating. Contents registry 340 may further identify a particular access provider 170 associated with digital contents.

Portal manager 350 may provide an interface, such as portal 150, that enables proxy device 110, content provider 120, retailer device 160, access provider 170, and/or client device 190 to interact with coordinator device 130, such as to access digital rights locker 140. For example, as previously described, client device 190 may register with device/domain manager 320, retailer device 160 may register a rights token stored by rights manager 330, and proxy device 110 may update contents records associated with contents registry 340. In another instance, client device 190 may access digital locker 140 via portal 150 managed by portal manager 350 and may acquire a rights token from digital locker 140 for accessing digital contents through access provider 170.

The configuration of components of device 300 shown in FIG. 3 is for illustrative purposes. Other configurations may be implemented. Therefore, device 300 may include additional, fewer and/or different components, that may be configured in a different arrangement, than that depicted in FIG. 3. Furthermore, tasks described as being performed by a single component may be performed by two or more components, and a single component may perform tasks described as being performed by two or more component of device 300.

Continuing with environment 100 shown in FIG. 1, retailer device 160 may provide a customer-facing storefront service to conduct transactions related to accessing the digital contents. For example, retailer device 160 may provide a digital storefront and e-commerce functionality via the digital storefront. For example, retailer device 160 may provide a website or other interface that may be accessed by client device 190 and may receive an input related to the desired digital contents, such as requesting access to a movie. Retailer device 160 may further manage a retail account associated with a customer and may provide payment capabilities.

After retailer device 160 receives an order for digital contents from client device 190, retailer device 160 may forward data associated with the order to coordinator device 130. This data may identify, for example, client device 190 and/or an associated customer, the digital contents associated with the order (e.g., a title and version of the digital contents), and the details of the order (e.g., whether the digital contents can be downloaded or streamed and a time frame when client device 190 may access the digital contents). Retailer device 160 may further create a unique rights token object and may provide the rights token object to client device 190 so that client device 190 may access the digital contents through access provider 170. Alternatively or in addition, retailer device 160 may forward the rights token object to coordinator device 130 for storage in digital rights locker 140, and client device 190 may obtain the rights token object from digital rights locker 140 in order to access the digital contents.

Access provider 170 may provide the digital contents to client device 190. For example, access provider 170 may process a request from client device 190 by identifying a domain associated with client device 190 and verifying a rights token associated with the request based on the domain. For example, access provider 170 may use the rights token to obtain encoding information and use this encoding information to decode the digital contents to client device 190. As shown in FIG. 1, access provider 170 may include, for example, download manager 171 that enables client device 190 to download the digital contents and/or streaming manager 172 that enables client device 190 to receive a stream of the digital contents.

Figure 4:
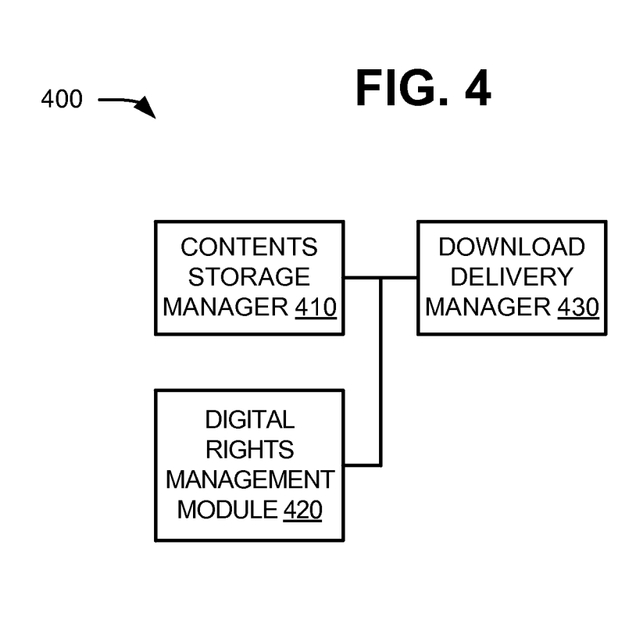
FIG. 4 is a block diagram of exemplary functional components of a download manager included in the environment of FIG. 1 according to an implementation.

Download manager 171 may allow client device 190 to download (e.g., a obtain and store a complete version) of the digital contents. FIG. 4 depicts components that may be included in an exemplary device 400 that corresponds to download manager 171 in one implementation. As shown in FIG. 4, device 400 may include contents storage manager 410, digital rights management module 420, and download delivery manager 430.

Contents storage manager 410 may acquire and store one or more versions of the digital contents. For example, contents storage manager 410 may provide an interface to receive the digital contents from proxy device 110. For example, contents storage manager 410 may register with proxy device 110 and provide feedback regarding downloads of the obtained digital contents. In one implementation, contents storage manager 410 may receive information from retailer device 160 identifying a transaction related to downloading digital contents and use this information to acquire a corresponding version of the digital contents. Thus, contents storage manager 410 may acquire the digital contents after retailer device 160 and client device 190 conduct a transaction.

Digital rights management module 420 may perform DRM functions on the copy of the digital contents obtained by contents storage manager 410. For example, digital rights management module 420 may encrypt the digital contents using a particular encryption key and may provide the encryption key to an intended client device 190 associated with a domain so that only the intended client devices 190 can decrypt the encrypted digital contents. Digital rights management module 420 may receive and store DRM domain credentials associated with each domain from coordinator device 130, and may issue DRM licenses with the correct keys required to decrypt digital contents associated with rights tokens.

Download delivery manager 430 may handle delivery of the encrypted digital contents to an appropriate client device 190. Download delivery manager 430 may provide an interface, such as a web site, through which client device 190 may provide authentication data and a rights token or other rights information. Download delivery manager 430 may establish a communications channel with client device 190 and/or provide a storage location (e.g., a uniform resource locator (URL) or other network address) associated with the encrypted digital contents. For example download delivery manager 430 may receive a rights token from client device 190 and may identify a storage location of the encrypted digital contents associated with the rights token (e.g., identify particular digital contents associated with a transaction between retailer device 160 and client device 190). Download delivery manager 430 may further interface with coordinator device 130 to verify that the rights token is correct and/or that client device 190 is authorized to use the received rights token.

The configuration of components of device 400 shown in FIG. 4 is for illustrative purposes. Other configurations may be implemented. Therefore, device 400 may include additional, fewer and/or different components, that may be configured in a different arrangement, than that depicted in FIG. 4. Furthermore, tasks described as being performed by a single component may be performed by two or more components, and a single component may perform tasks described as being performed by two or more component of device 400.

Figure 5:
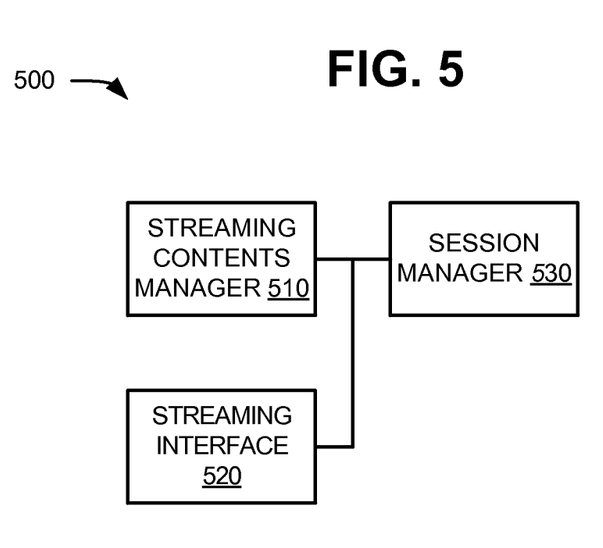
FIG. 5 is a block diagram of exemplary functional components of a streaming manager included in the environment of FIG. 1 according to an implementation.

Streaming manager 172 may allow client device 190 to stream a version of the digital contents. FIG. 5 depicts components that may be included in an exemplary device 500 that corresponds to streaming manager 172 in one implementation. As shown in FIG. 5, device 500 may include streaming contents manager 510, streaming interface 520, and session manager 530.

Streaming contents manager 510 may identify a storage location for the digital contents. For example, streaming contents manager 510 may register with proxy device 110 to determine a location where the digital contents are stored. For example, streaming contents manager 510 may acquire and store a copy of the digital contents from proxy device 110, and the storage location may correspond to a location where streaming contents manager 510 stores a copy of the digital contents. In one implementation, streaming contents manager 510 may receive information from retailer device 160 identifying a transaction related to streaming digital contents and use this information to identify the storage location of the digital contents.

Streaming interface 520 may receive a rights token from client device 190 and may identify a storage location (e.g., a uniform resource locator (URL) or other network address) associated with the digital contents associated with the rights token (e.g., identify particular digital contents associated with a transaction between retailer device 160 and client device 190). For example, streaming interface 520 may provide a webpage or other type of interface that allows client device 190 to submit the rights token and to request streaming delivery of the digital contents.

Streaming interface 520 may further interface with coordinator device 130 to verify that the rights token is valid and/or that client device 190 is authorized to use the rights token. For example, streaming interface 520 may determine whether the rights token has been previously used by client device 190 and if so, whether the rights token may be used again (e.g., whether the digital contents can be streamed on more than one instance).

In one implementation, streaming interface 520 may identify a particular version of the streaming digital contents based on a device identifier associated with client device 190 and/or the rights token. For example, streaming interface 520 may determine a format that is compatible with hardware and/or software associated with client device 190 (e.g., format that can be displayed by a display associated with client device 190, a format that is compatible with a media player associated with client device 190, etc.) and may identify a version of the digital contents based on the compatible format. Streaming interface 520 may further determine a format of the digital contents based on a transaction between client device 190 and retailer device 160. For example, a customer may select different versions (e.g., SD versus HD), and the rights token may allow client device 190 to receive a stream associated with the selected version of the digital contents.

Session manager 530 may establish a communications channel with client device 190 based on the storage location and in response to the submission of rights token by client device 190. For example, session manager 530 may exchange data with client device 190 to initiate streaming of the digital contents from the storage location. Session manager 530 may further monitor a status of the session or other streaming communications with client device 190 and may repair and/or initiate new communications related to streaming the digital contents.

The configuration of components of device 500 shown in FIG. 5 is for illustrative purposes. Other configurations may be implemented. Therefore, device 500 may include additional, fewer and/or different components, that may be configured in a different arrangement, than that depicted in FIG. 5. Furthermore, tasks described as being performed by a single component may be performed by two or more components, and a single component may perform tasks described as being performed by two or more component of device 500.

Continuing with environment 100 in FIG. 1, client device 190 may communicate with one or more of proxy device 110, coordinator device 130, retailer device 160 and/or access provider 170 via network 180. Network 180 may include one or more networks including, for example, a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a telecommunications network (e.g., Public Switched Telephone Networks (PSTNs)), a local area network (LAN), a wide area network (WAN), a metropolitan area network (MAN), an intranet, the Internet, or a cable network (e.g., an optical cable network). Network 180 may include a contents delivery network (not shown) having multiple nodes that allow the streaming of, or downloading of, digital contents from access provider 170 to client devices 190, as described below. Although shown as a single element in FIG. 1, network 180 may include a number of separate networks that function to provide communications and/or services to client device 190.

Client device 190 may include a computational or communication device that enables a customer to view digital contents such as a video, or interact with another client device 190 or a video display device (e.g., a set-top box and/or television). Different types of client device 190 may include, for example, a personal communications system (PCS) terminal, a tablet computer, a smartphone, a personal computer, a laptop computer, a gaming console, an Internet television, or other types of computation or communication devices such as a smart TV or other device (e.g., a digital video recorder or a media player) that executes an application to communicate via network 180 with, for example, proxy device 110, portal 150, retailer device 160, and/or access provider 170.

The configuration of components of environment 100 shown in FIG. 1 is for illustrative purposes. Other configurations may be implemented. Therefore, environment 100 may include additional, fewer and/or different components, that may be configured in a different arrangement, than that depicted in FIG. 1.

Figure 6:
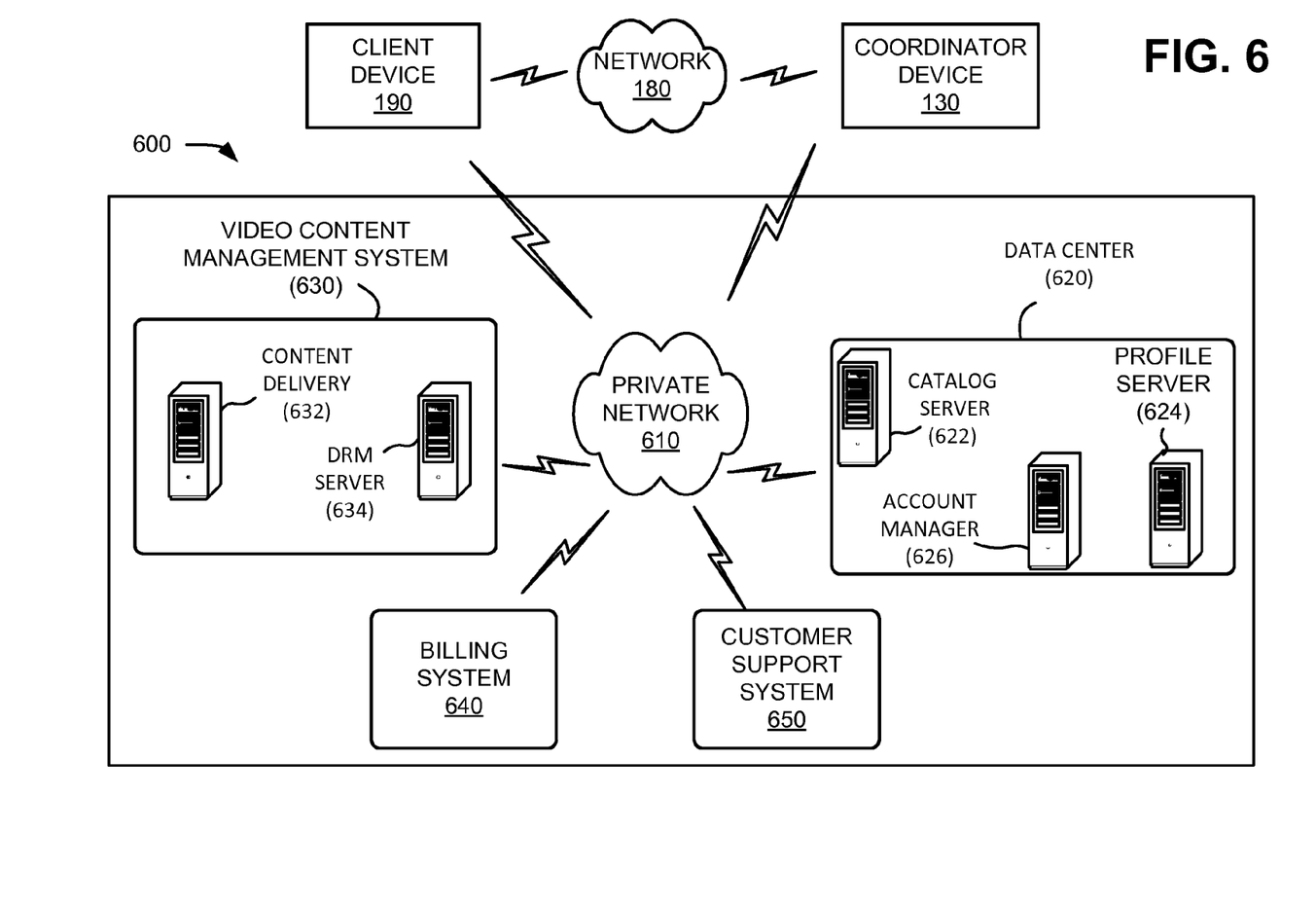
FIG. 6 is a block diagram of exemplary components included in an exemplary service network that may include one or more components in the environment of FIG. 1 according to an implementation.

In one implementation, proxy device 110, retailer device 160, and/or access provider 170 may be included in a service network. For example, FIG. 6 shows an exemplary service network 600 which includes the functionality of proxy device 110, retailer device 160 and/or access provider 170 in accordance with one implementation. Service network 600 may receive and process digital contents from content provider 120, receive an order from a customer for the digital contents, form related digital rights tokens that may be collected in a digital rights locker, enable the customer to acquire digital rights using the digital rights token, and use the acquired digital rights to access the digital contents.

As shown in FIG. 6, service network 600 may include, for example, private network 610, data center 620, video content management system (VCMS) 630, billing system 640, and customer support system 650.

Private network 610 may include, for example, one or more private IP networks that use a private IP address space. Private network 610 may include a local area network (LAN), an intranet, a private wide area network (WAN), an optical network, etc. In one implementation, private network 610 may implement one or more Virtual Private Networks (VPNs) for providing communication between, for example, data center 620, VCMS 630, billing system 640, and/or customer support system 650. Private network 610 may be protected/separated from other networks, such as network 180, by a firewall (not shown). Although shown as a single element in FIG. 6, private network 610 may include a number of separate networks.

Data center 620 may manage customer authentication, authorization for playing contents, selection of contents, and/or purchase of contents by a customer of client device 190. Data center 620 may provide a backend support system for applications residing on client device 190. For example, profile server 624 may authenticate (e.g., via account manager 626) a customer who desires to purchase, rent, or subscribe to digital or physical contents. In another example, data center 620 may permit client device 190 to download a video application that enables a customer to find contents of interest or play downloaded or streaming contents. Once client device 190 is registered at/via data center 620, the downloaded video application may enable client device 190 to present to a customer of client device 190 information received from data center 620 in an interactive format, to allow selection of particular digital contents. Furthermore, the video application may coordinate with VCMS 630 and data center 620 in authorizing client device 190 to access the selected contents, for concurrent viewing sessions or otherwise.

As shown in FIG. 6, data center 620 may include a catalog server 622, a profile server 624, and an account manager 626. In one implementation, the interactions between data center and client device 190 may be performed using hypertext transfer protocol (HTTP) or secure HTTP (HTTPS) via private network 610 and/or network 180.

Catalog server 622 may provide a unified catalog of contents (e.g., both digital contents and physical assets) for customer of client device 190 to consume (e.g., buy, rent, or subscribe). In one implementation, catalog server 622 may collect and/or present listings of contents available to client device 190. For example, catalog server 622 may receive digital contents metadata and/or physical asset metadata, such as lists or categories of contents, from VCMS 630. Catalog server 622 may use the contents metadata to provide currently-available contents options to client device 190. Catalog server 622 may provide the contents metadata to client device 190 directly or may communicate with client device 190 via another device (e.g., account manager 626).

Profile server 624 may store customer profile information for customers (e.g., customers of client device 190). The customer profile information may include various information regarding a customer, such as login information (e.g., a customer identifier and a password), billing information, address information, types of services to which the customer has subscribed, a list of digital/physical contents purchased by the customer, a list of video contents rented by the customer, a list of video contents to which the customer has subscribed, a customer device identifier (e.g., a media player identifier, a mobile device identifier, a set top box identifier, a personal computer identifier) for client device 190, or the like. Account manager 626 may use the customer profile information from profile server 624 to authenticate a customer and may update the customer profile information based on the customer's activity.

Account manager 626 may include a network device or computing device that may manage access to services provided by service network system 600. For example, account manager 626 may initiate accounts for new subscriptions (e.g., a free trial subscription, a paid subscription, etc,) and monitor existing subscriptions. Account manager 626 may receive a login request associated with a customer and may initiate a login process. Additionally, or alternatively, account manager 626 may request/receive device information (e.g., a registration token) associated with client device 190 via VCMS 630, and may compare the device information with stored information to validate/authenticate client device 190. Depending on the implementation, the stored information may reside in catalog server 622, profile server 624, account manager 626, etc.

In one implementation, data center 620 may function as retailer device 160, for example, to identify digital contents available to client device 190, accept an order from client device for digital content, obtain a rights token from VCMS 630 related to the digital content, provide information to coordinator device 130 regarding the purchase and the rights token.

VCMS 630 may aggregate contents and contents metadata, process contents, and distribute contents. For example, VCMS 630 may transcode contents into a digital format suitable for consumption on particular client device 190. In some implementations, VCMS 630 may include a transcoder (hardware or software) to convert a video file from one format to another (e.g., from one bit rate to another bit rate, from one resolution to another, from one standard to another, from one file size to another, etc). VCMS 630 may also encrypt data.

As further shown in FIG. 6, VCMS 630 may include a content delivery system 632 and a digital rights management (DRM) server 634. Content delivery system 632 may deliver digital contents from a backend server to client device 190 via, for example, a content delivery network (CDN). In one implementation, content delivery system 632 may include a device that provides streaming data (e.g., via a streaming URL) to client device 190 (e.g., via network 180). In one implementation, a streaming URL can be used only once for one client device 190 for security purposes.

DRM server 634 may issue, validate, and/or enforce DRM licenses to a client, such as an application running on one of client device 190. In some implementations, DRM server 634 may determine entitlement rights and/or other authorization parameters via interfaces of data center 620. Such information may be used to authorize a customer to access particular contents (e.g., issue a license to client device 190), and control/limit the number of concurrent viewing sessions for the customer.

In one implementation, VCMS 630 may function as proxy device 110 to, for example, receive and process digital content from content provider 120 and provide coordinator device 130 with information related to the digital content. In another implementation, VCMS 630 may function as access provider 170 to receive a rights token from client device 190 and provide client device 190 with access to the digital content based on receiving the rights token. For example, VCMS 630 may obtain digital rights information associated with the rights token and use the digital rights information to provide the digital contents to client device 190.

Billing system 640 may manage charging customers for services provided via service network 600. Billing system 640 may perform credit card checks (e.g., for new subscriptions and/or trial subscriptions) and process payments for subscriptions. For example, for new accounts, billing system 640 may initiate credit card checks and receive credit card verification from an external billing entity, such as a credit card payment system (e.g., for a credit card account associated with the customer) or a bank payment system (e.g., for a debit account associated with the customer), associated with the customer and/or client device 190, via an external payment API (not shown). For paying (e.g., non-trial) subscribers, billing system 640 may also request and receive payments from the external billing entity (e.g., for monthly subscription fees, etc. associated with an account).

Customer support system 650 may solicit and/or receive customer feedback, questions, or credit-related requests. In one implementation, customer support system 650 may include interfaces for accessing data center 620 and/or billing system 640, for example, to receive problem reports and to resolve customer billing disputes.

In FIG. 6, the particular arrangement and number of components of service network 600 are illustrated for simplicity. In practice, there may be more private networks 610, data centers 620, VCMSs 630, billing systems 640, customer support systems 650, and/or client device 190. Components of service network 600 may be connected via wired and/or wireless links.

The configuration of components of service network 600 shown in FIG. 6 is for illustrative purposes. Other configurations may be implemented. Therefore, service network 600 may include additional, fewer and/or different components, that may be configured in a different arrangement, than that depicted in FIG. 6. Furthermore, tasks described as being performed by a single component may be performed by two or more components, and a single component may perform tasks described as being performed by two or more component of service network 600.

Figure 7:
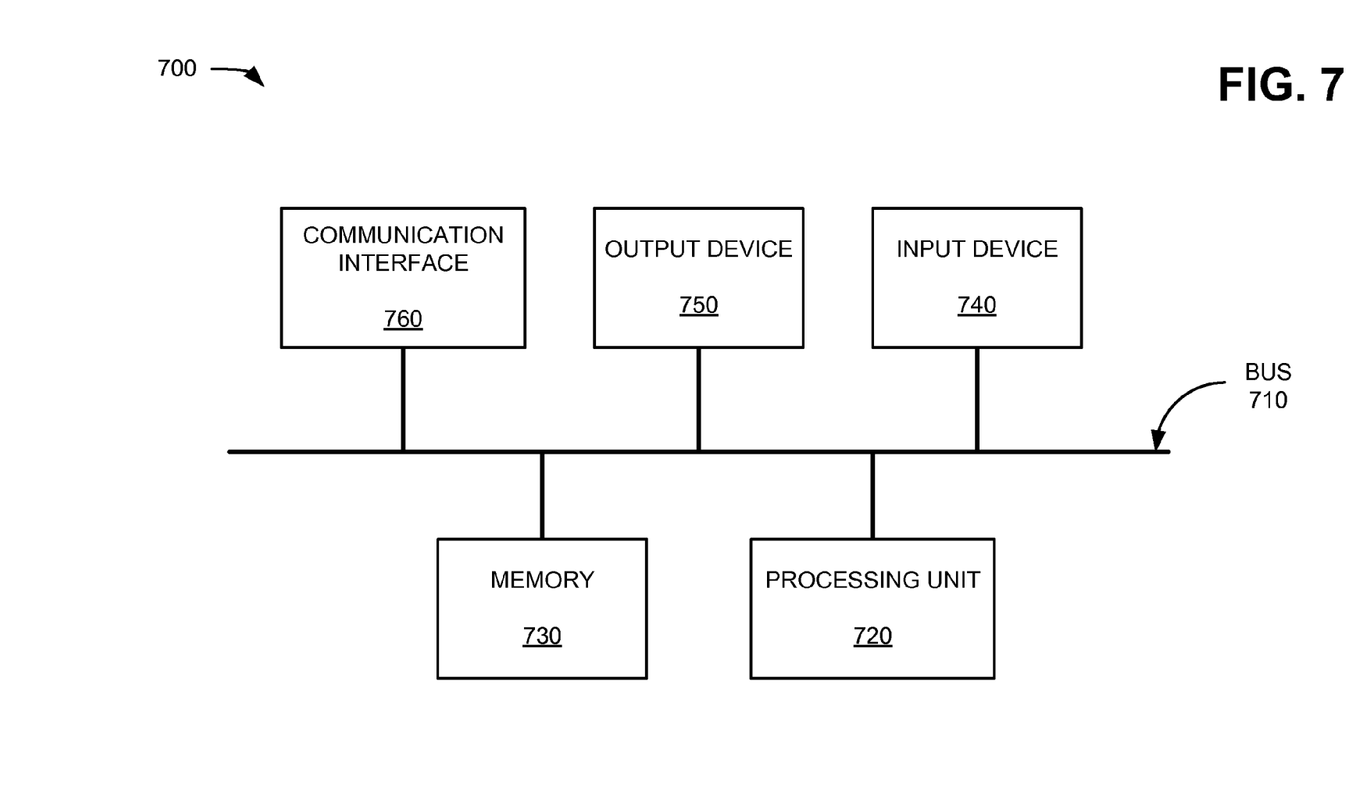
FIG. 7 is a block diagram of exemplary components of a device that may correspond to any one of the devices of FIGS. 1-6 according to an implementation.

FIG. 7 is a diagram of exemplary components of a device 700. One or more of components included in environment 100 and or service network 600 may be implemented/installed as software, hardware, or a combination of hardware and software, on one or more of device 700. In one implementation, device 700 may be configured as a network device. In another implementation, device 700 may be configured as a computing device. As shown in FIG. 7, device 700 may include, for example, a bus 710, a processing unit 720, a memory 730, an input device 740, an output device 750, and a communication interface 760.

Bus 710 may permit communication among the components of device 700. Processing unit 720 may include one or more processors or microprocessors that interpret and execute instructions. In other implementations, processing unit 720 may be implemented as or include one or more application specific integrated circuits (ASICs), field programmable gate arrays (FPGAs), and/or the like.

Memory 730 may include a random access memory (RAM) or another type of dynamic storage device that stores information and instructions for execution by processing unit 720, a read only memory (ROM) or another type of static storage device that stores static information and instructions for the processing unit 720, and/or some other type of magnetic or optical recording medium and its corresponding drive for storing information and/or instructions.

Input device 740 may include a device that permits an operator to input information to device 700, such as a keyboard, a keypad, a mouse, a pen, a microphone, one or more biometric mechanisms, and the like. Output device 750 may include a device that outputs information to the operator, such as a display, a speaker, etc.

Communication interface 760 may include a transceiver that enables device 700 to communicate with other devices and/or systems. For example, communication interface 760 may include mechanisms for communicating with other devices, such as other devices of environment 100.

As described herein, device 700 may perform certain operations in response to processing unit 720 executing software instructions contained in a computer-readable medium, such as memory 730. A computer-readable medium may include a tangible, non-transitory memory device. A memory device may include space within a single physical memory device or spread across multiple physical memory devices. The software instructions may be read into memory 730 from another computer-readable medium or from another device via communication interface 760. The software instructions contained in memory 730 may cause processing unit 720 to perform processes described herein. Alternatively, hardwired circuitry may be used in place of or in combination with software instructions to implement processes described herein. Thus, implementations described herein are not limited to any specific combination of hardware circuitry and software.

Although FIG. 7 shows exemplary components of device 700, in other implementations, device 700 may include fewer components, different components, differently arranged components, or additional components than depicted in FIG. 7. As an example, in some implementations, a display may not be included in device 700. In these situations, device 700 may be a "headless" device that does not include an input device. Alternatively, or additionally, one or more components of device 700 may perform one or more other tasks described as being performed by one or more other components of device 700.

Figure 8:
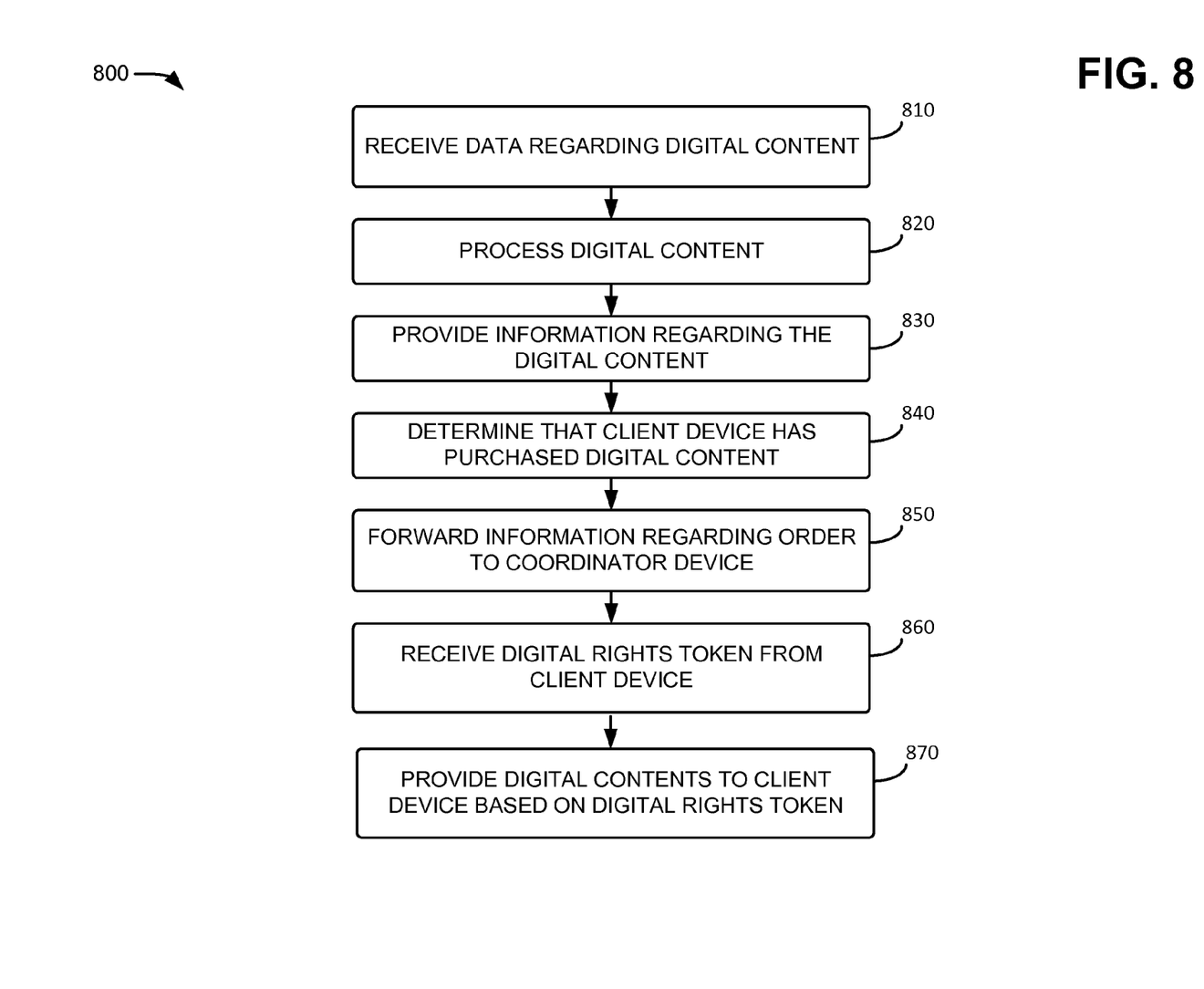
FIG. 8 is a flow diagram of an exemplary process for managing digital rights according to an implementation.

FIG. 8 is a flow diagram of an exemplary process 800 for dynamically managing digital rights. In one implementation, process 800 may be performed by proxy device 110. In other implementations, process 800 may be performed by using proxy device 110 and one or more other devices included in environment 100.

Process 800 may include receiving data regarding the digital content (block 810) and processing the received data (block 820). For example, proxy device 110 may receive the digital content and related metadata from content provider 120 in block 810. Proxy device may further receive metadata regarding the digital content from another source, such as performing an internet search related to the digital content to gather additional metadata and/or to identify other digital contents (e.g., identifying other movies in which the actors in the digital contents also appear).

In block 820, proxy device 110 may process the digital content and/or the related metadata to determine information associated with the digital content. For example, proxy device 110 may identify a title or other identifier associated with the digital content and may properly format the title for use by the coordinator device 130 and/or the retailer device 160. As previously described, the title may be formatted, for example, as an ALID.

In block 820, proxy device 110 may format, or transcode, the digital content for distribution to client device 190. For example, proxy device 110 may aggregate digital contents received from content provider 120 and transcode the digital contents into a format suitable for consumption on particular client devices 190. For example, proxy device 110 may convert a video file from one format to another (e.g., from one bit rate to another bit rate, from one resolution to another, from one standard to another, from one file size to another, etc.). In block 820, proxy device 110 may also encrypt data and perform DRM functions to enforce digital rights. For example, if the digital content is to be streamed, proxy device 110 may format the digital content into a streaming format that may be divided into portions and reformed by client device 190. In another instance in which the digital content is to be downloaded by client device 190, proxy device 110 may format the digital contents for use by client device when downloaded. For example, proxy device 110 may convert the digital contents into the CFF. In block 820, proxy device 110 may further encrypt, encode, and/or perform various DRM functions. Proxy device 110 may further form one or more digital tokens that may be used to access the processed digital contents. For example, the digital token may allow client device 190 to access information to decode and/or decrypt the processed digital contents.

Process 800 may also include providing the digital contents and/or the related information (block 830). For example, proxy device 110 may provide information regarding the digital contents (e.g., the ALID) and/or the digital tokens to coordinator device 130 (e.g., to register the digital contents), retailer device 160 (e.g., to enable retailer device 160 to provide a catalog that identifies the digital contents), etc., and may provide the formatted digital contents to access provider 170 (e.g., to enable access provider 170 to provide the digital contents to client device 190). In another implementation, proxy device 110 may also directly provide the digital contents to client device 190. For example, proxy device 110 provide the digital contents to client device 190 based on receiving an indication from retailer device 160 that client device 190 has purchased a subscription for the digital content.

Process 800 may also include determining that client device 190 has purchased access to digital content (block 840), and forwarding information regarding the order to coordinator device 130 (block 850). In block 840, retailer device 160 may identify the digital contents in a catalog provided to client device 190, and client device 190 may select the digital contents from the catalog. For example, retailer device 160 may provide an interface to client device 190 and may receive an input from client device 190, via the interface, requesting the digital contents. The retailer device 160 may further process payment information related to the request for the digital contents, such as implementing a credit card payment system and/or a bank payment system to charge a fee to a customer associated with client device 190.

In block 850, retailer device 160 may forward information to coordinator device 130 regarding the transaction. For example, retailer device 160 may confirm a purchase of the digital assets by client device 190 and forward an associated rights token to coordinator device 130. For example, retailer device 160 may interface with portal 150 to forward the purchase information and/or the rights token to coordinator device 130 along with information identifying client device 190 and/or an associated customer. Coordinator device 130 may store the rights token in digital rights locker 140 for access by client device 190 and/or the associated customer.

Continuing with process 800 in FIG. 8, the rights token may be received from client device 190 (block 860), and the digital contents may be provided to the client device based on receiving the rights token from client device 190 (block 870).

In block 860, access provider 170 may, for example, provide an interface to receive the rights token and other information (such as information identifying client device 190 and/or an associated customer) from client device 190. In block 870, access provider 170 may further assess and validate the rights token in block 860, acquire digital rights data (e.g., data to locate, decrypt, and decode the digital contents), and stream and/or download the digital contents to client device 190 as described above with respect to download manager 171 and streaming manager 172.

In one implementation, access provider 170 may provide client device 190 with different amounts of access to the digital contents in block 870 based on evaluating the rights token and/or information regarding client device 190. For example, access provider 170 may allow client device 190 to have limited access to the digital contents (e.g., allow client device 190 to access a portion that is less than the entire digital contents) while access provider 170 identifies a customer associated with client device 190 and determines whether the identified customer is authorized to the use the rights token.

Figure 9:
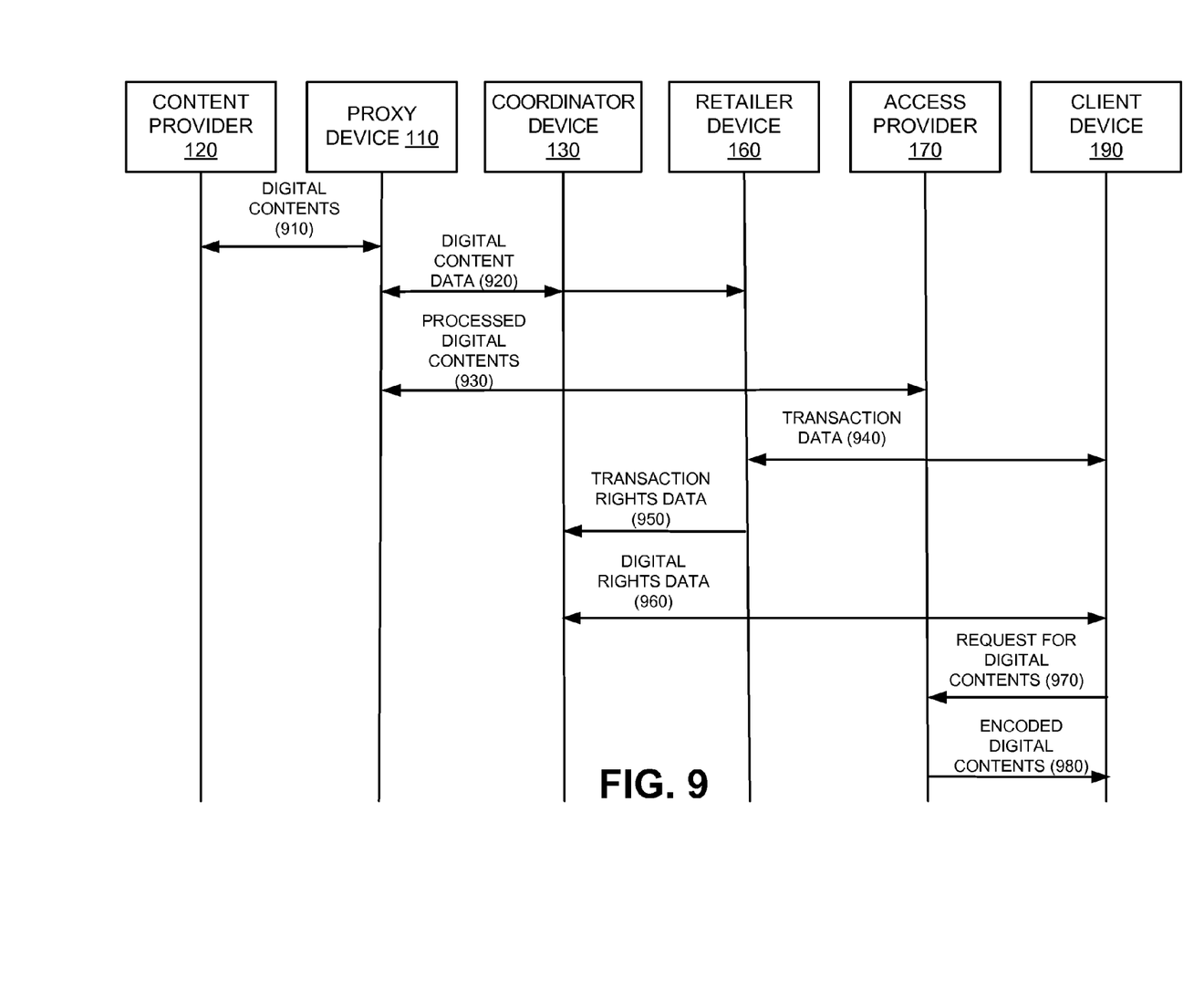
FIG. 9 is a block diagram of exemplary communications among devices within the environment of FIG. 1.

FIG. 9 depicts exemplary communications between one or more proxy device 110, content provider 120, coordinator device 130, retailer device 160, access provider 170, and/or client device 190 during process 800 in one implementation. (Communication between and amongst these functionalities in FIG. 1 is shown as bidirectional in each instance. However, in the instant example, certain communications may only be unidirectional.) For example, content provider 120 may provide digital contents 910 to proxy device 110, and proxy device 110 may process the digital contents to form digital contents data 920 (e.g., an identifier for the digital contents and/or the rights token) and processed digital contents 930 (e.g., an encoded, encrypted, and/or DRM-modified version of the digital contents).

Proxy device 110 may forward the digital content data 920 to coordinator device 130 and/or retailer device 160, and proxy device 110 may further forward the processed digital contents 930 to access provider 170. In this way, digital contents from contents provider 120 may be registered with coordinator device 130 and prepared for distribution (via access provider 170) to client device 190 with minimal involvement by contents provider 120.

Retailer device 160 may exchange transaction data 940 with client device 190 based on the digital content data. For example, retailer device 160 may provide an interface to provide a catalog to client device 190 identifying the digital contents and the related metadata, and retailer device 160 may receive an input from client device 190 requesting delivery of the digital contents. In response to exchanging the transaction data 940, retailer device 160 may provide coordinator device 130 with transaction rights data 940, such as the rights token associated with the digital contents for storage in digital rights locker 140.

In one example, a customer associated with client device 190 may be a subscriber of a particular type and/or combination of services, such as a subscriber of a fiber optic network service, a telecommunications network service, an Internet service, a cable television service, etc. For example, client device 190 may be a set top box (STB) that accesses a fiber optic network service, and a customer may purchase an on-demand movie using the STB through an interface, such as a GUI provided by retailer device 160. Retailer device 160 may receive the order and provide information (e.g., storage address, decryption code, etc.) that allows the STB to access the on-demand movie through access provider 170.

Continuing with FIG. 9, coordinator device 130 and client device 190 may exchange digital rights data 960. For example, coordinator device 130 may provide an interface, such as portal 150, through which client device 190 may request the rights token, and coordinator device 130 may verify the request and provide the rights token to client device 190.

Returning to the above-example in which a customer purchases access to an on-demand movie through an STB, after initially accessing the movie, the customer may desire further access (e.g., accessing the movie at a later time and/or using a different client device 190). Rather than having to store the digital rights, client device 190 may access digital rights locker 140 to acquire a rights token that is used to obtain the digital rights as needed. It should be noted that digital rights associated with the rights token acquired through digital rights locker 140 may differ from the information originally provided to client device 190 to access the on-demand movie. For example, the rights token acquired from digital rights locker 140 may by valid for a different time period, for a particular client device 190, for a different type of access (e.g., downloading versus streaming), and/or for a particular number of uses.

Furthermore, client device 190 receive another rights token from coordinator device 130 (i.e., through digital rights locker 140) to access digital contents that are purchased through a separate retailer device 160 that is not associated with the service network. Continuing with the above example, the customer may access digital rights locker 140 using the STB to obtain a digital rights token associated with a transaction conducted through a different device (e.g., a computer) outside of the service network. In this way, a customer may use digital rights locker 140 to access record purchase records associated with through multiple different client device 190, retailers, and networks.

Client device 190 may forward a request for the digital contents 970 to access provider 170, and access provider 170 may verify, based on the rights token, that client device 190 is entitled to receive the digital contents. If the client device 190 is entitled to receive the digital contents, access provider 170 may provide an encoded version of digital contents 980 to client device 190. For example, when client device 190 is entitled to receive the digital contents, access provider 170 may provide a stream that included the digital contents to client device and/or may allow client device 190 to download a version of the digital contents.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIG. 8, the order of the blocks may be modified in other implementations. Further, non-dependent blocks may be performed in parallel. Similarly, while series of communications have been described with respect to FIG. 8, the order of the communications may be modified and additional or few communications may be exchanged in other implementations.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method comprising:
    receiving, by a processor, information associated with digital contents;
    processing, by the processor, the information associated with the digital contents to obtain processed digital contents;
    registering, by the processor and based on the processed digital contents, the digital contents with a coordinator device, wherein the coordinator device maintains a digital rights locker, and wherein registering the digital contents includes:
        determining a content identifier associated with the digital contents,
        forming an asset logical identifier (ALID) based on the content identifier, and
        forwarding the ALID to the coordinator device;
    providing, by the processor, a rights token to the coordinator device, wherein the coordinator device stores the rights token in the digital rights locker;
    receiving, by the processor, the rights token and a device identifier from a first client device, wherein the first client device obtains the rights token from the digital rights locker;
    identifying by the processor, transaction information related to a purchase of the digital contents by a second client device associated with a customer;
    determining, by the processor and based on the device identifier, whether the first client device is associated with the customer; and
    enabling, by the processor and when the first client device is associated with the customer, the first client device to access the processed digital contents using the rights token.

2. The method of claim 1, wherein forming the ALID based on the content identifier includes:
    forming a uniform resource name (URN) that includes:
        the content identifier,
        a category associated with the digital contents, and
        relationship data identifying another related digital content.

3. The method of claim 1, wherein processing the information associated with the digital contents includes at least one of:
    encoding the digital contents for streaming to the first client device, or
    preparing the digital contents for downloading by the first client device.

4. The method of claim 1, wherein the first client device is included in a plurality of types of client devices, and
    wherein processing the information associated with the digital contents includes:
        converting the digital contents to a common file format that is compatible with the plurality of types of client devices.

5. The method of claim 1, wherein processing the information associated with the digital contents includes:
    performing digital rights management on the digital contents.

6. The method of claim 1, wherein the first client device accesses the digital content via a service provider, and wherein the second client device purchases the digital contents from a party who differs from the service provider.

7. The method of claim 1, wherein the processed digital contents are encrypted, and wherein enabling the first client device to access the processed digital contents includes:
    providing the first client device with information to decrypt the processed digital contents.

8. A system comprising:
    a memory; and
    a processor configured to:
        receive information associated with digital contents,
        register the digital contents with a coordinator device, wherein the coordinator device maintains a digital rights locker, and wherein the processor, when registering the vital contents, is configured to:
            determine a content identifier associated with the digital contents,
            form an asset logical identifier (ALID) based on the content identifier, and
            forward the ALID to the coordinator device,
        process the information associated with the digital contents,
        store, in the memory, the processed information associated with the digital contents,
        provide a rights token to the coordinator device, wherein the coordinator device stores the rights token in the digital rights locker,
        receive the rights token and a device identifier from a first client device, wherein the first client device obtains the rights token from the digital rights locker,
        identify, based on the rights token, transaction information related to a purchase of the digital contents by a second client device associated with a customer,
        determine, based on the device identifier, whether the first client device is associated with the customer, and
        enable the first client device to access the memory to acquire the processed information associated with the digital contents when the first client device is associated with customer.

9. The system of claim 8, wherein the processor, when forming the ALID based on the content identifier, is further configured to:

form a uniform resource name (URN) that includes:
the content identifier,
a category associated with the digital contents, and
relationship data identifying another related digital content.

10. The system of claim 8, wherein the processor, when processing the information associated with the digital contents, is further configured to:
form a first version of the digital contents for downloading to the first client device, and
form a second version of the digital content for streaming to the first client device,
wherein the processor, when storing the processed information associated with the digital contents in the memory, is further configured to:
store the first version of the digital contents and the second version of the digital contents.

11. The system of claim 8, wherein the processed information associated with the digital contents include digital rights management content.

12. The system of claim 8, wherein the first client device is included in a plurality of types of client devices, and
wherein the processor, when processing the information associated with digital contents, is further configured to:
convert the digital contents to a common file format that is compatible with the plurality of types of client devices.

13. The system of claim 8, wherein the first client device accesses the digital content through a service provider, and wherein the second client device purchases the digital contents from a party who differs from the service provider.

14. The system of claim 8, wherein the processed information associated with the digital contents is stored at a portion of the memory, and wherein the processor, when enabling the first client device to access the memory to acquire the processed information associated with the digital contents, is further configured to:
forward, to the first client device, information identifying the portion of the memory storing the processed information associated with the digital contents.

15. A non-transitory computer-readable medium to store instructions, the instructions comprising:
one or more instructions that, when executed by a processor, cause the processor to be configured to:
receive digital contents from a content provider;
determine content identifier associated with the digital contents;
form an asset logical identifier (ALID) based on the content identifier;
forward the ALID to a coordinator device;
process the digital contents, wherein processing the digital contents includes forming a rights token;
forward the rights token to the coordinator device, wherein the coordinator device stores the rights token in a digital rights locker;
receive the rights token and a device identifier from a first client device, wherein the first client device acquires the rights token from the digital rights locker;
identify transaction information related to a purchase of the digital contents by a second client device associated with a customer;
determine, based on the device identifier, whether the first client device is associated with the customer; and
enable the first client device to access the processed digital contents using the rights token when the first client device is associated with the customer.

16. The non-transitory computer-readable medium of claim 15, wherein the one or more instructions cause the processor, when forming the ALID based on the content identifier, to be further configured to:
form, as the ALID, a uniform resource name (URN) that includes:
the content identifier,
a category associated with the digital contents, and
relationship data identifying another related digital content.

17. The non-transitory computer-readable medium of claim 15, wherein the one or more instructions cause the processor, when processing the digital contents, to be further configured to:
form a container that includes the digital contents and digital rights management content, wherein the first client device accesses the container based on the rights token.

18. The non-transitory computer-readable medium of claim 15, wherein the one or more instructions cause the processor, when processing the digital contents, to be further configured to:
form a plurality of versions of the digital contents, wherein the plurality of versions are associated with a plurality of formats, and
wherein the one or more instruction cause the processor, when enabling the first client device to access the processed digital contents, to be further configured to:
identify a particular version, of the plurality of versions, that is compatible with the first client device; and
enable the first client device to access the particular version of the digital contents.

19. The non-transitory computer-readable medium of claim 15, wherein the digital contents are received from a first party, the first client device accesses the digital content through a second party who differs from the first party, and the second client device purchases the digital contents from a third party who differs from the first party and the second party.

20. The non-transitory computer-readable medium of claim 15, wherein the transaction information identifies a quantity of times that the customer is authorized to access the digital contents, and wherein the one or more instructions cause the processor to be configured to enable the first client device to access the processed digital contents when the customer has accessed the digital contents less than the quantity of times.

\* \* \* \* \*